Feb. 9, 1926.

H. P. NELSON ET AL 1,572,029

VEHICLE BODY

Filed May 17, 1923

INVENTORS
George Davies
and Hans P. Nelson
by Pierre Barnes
ATTORNEY

Patented Feb. 9, 1926.

1,572,029

UNITED STATES PATENT OFFICE.

HANS P. NELSON AND GEORGE DAVIES, OF SEATTLE, WASHINGTON, ASSIGNORS OF ONE-THIRD TO GEORGE E. COOK, OF SEATTLE, WASHINGTON.

VEHICLE BODY.

Application filed May 17, 1923. Serial No. 639,606.

*To all whom it may concern:*

Be it known that we, HANS P. NELSON and GEORGE DAVIES, citizens of the United States, residing at Seattle, in the county of King and State of Washington, have invented certain new and useful Improvements in Vehicle Bodies, of which the following is a specification.

This invention relates to wheeled vehicles and, more especially, to an improved construction of the body or box portion thereof; and its object, generally, is the improvement in means for detachably securing the sides and top of a vehicle body in place.

More specific objects and advantages of the invention will appear in the following description.

The invention consists in the novel construction, adaptation and combination of parts hereinafter described and claimed.

In the accompanying drawing,—

Figure 1 is a side elevation of a motor truck embodying our invention. Fig. 2 is a vertical sectional view taken substantially through 2—2 of Fig. 1. Fig. 3 is a fragmentary perspective view of a front corner of the vehicle body. Figs. 4 and 5 are detail sectional views through 4—4 and 5—5 of Fig. 2.

In said drawing, the reference numeral 6 represents a vehicle having a platform consisting of end and side sills, such as 7 and 8, respectively, which serve as a frame for the floor boards 9.

The above assembly of sills and boards are rigidly secured together and to beams 10 which are arranged transversely of the body. At the front end of the body is a wall 11 which is rigidly secured to said platform and is desirably formed of transversely arranged boards 12, two being shown in Fig. 3.

For convenience in carrying long articles, such as poles, pipe, etc., the lower of such wall boards is preferably cut away to afford an opening 13 (Fig. 3) through which the articles may protrude.

The side walls of the body are each formed of superposed boards 14 rigidly secured together and also secured to vertically disposed tubular stake elements 15 whose lower ends extend below the respective side walls to engage in sockets 16 secured to the ends of the platform beams 10.

As illustrated, the stakes 15 are secured to a side wall, see Fig. 5, by means of headed screw threaded bolts 17 extending through stake embracing stirrups 18 to receive nuts 19 at the outer sides of the respective stirrups. Said bolts couple the stirrups with the wall boards by extending through the latter and metal plates 20 provided upon the inner side of each wall, said plates serving as bearings for the bolt heads.

The sockets 16 above referred to consist, preferably, of short lengths of pipe with a pipe-cap 21 secured to the lower end of each. For securing a socket to a beam end we employ against the outer side of the socket a clamping plate, such as 22 in Fig. 4, through apertured ears of which extend the screw threaded ends 23 of beam attachments 24 to receive securing nuts 25 which engage against the clamping plate.

The attachments 24 are themselves secured to the respective beams by means of coupling bolts 26 and nuts 27 taking on the bolts.

From the foregoing it is apparent that the side walls are separably connected to the platform by engaging the downwardly protruding ends of the stakes 15 within the respective sockets 16 which are rigidly secured to said platform. Supplemental to said stake and socket connections the side walls are detachably connected to the front wall 11 at each side of the latter by means of an angle plate 28, one element of which is secured as by rivets 29 to said front wall and its other element, or flange 30, is spaced from the adjacent end of the front wall to provide a groove for the reception of an end of a side wall. A metal wearing plate 31 is advantageously secured against the outer side of a side wall to bear against the flange 30 of an angle plate.

Included in the invention are posts 32, preferably, of iron pipe, which are arranged to engage in the hollow wall stakes 15 and have their upper ends engage in socket attachments 33 depending from the vehicle top or canopy 34.

To accommodate an unusually high load in the vehicle, the top may be held in a more elevated position than that in which it is shown by inserting blocks (not shown) within said stakes to afford supports for the lower ends of the posts 32.

The advantages of the invention reside principally in the provision of strong and durable devices of light weight which serve, first, to detachably connect the side walls of a vehicle in operative positions; and, second, to detachably connect the top with the side walls and to the platform structure through the medium of the roof supporting posts, the hollow wall stakes and the sockets therefor.

With our devices the parts are most conveniently removed from or replaced into their operative relations.

What we claim, is,—

1. Means for detachably mounting portions of a vehicle body and a top therefor, comprising a plurality of detachable stirrups constituting retaining members carried by portions of the body and arranged to vertically align in spaced relationship in assembly clamping plates arranged on the body and aligning with the stirrups, a tubular socket member carried by the clamping plates, a tubular stringer member adapted to be trained through the respective stirrups and to be seated in the socket member whereby to maintain said portions of the body in assembly, and said stringer members being freely movable with respect to said stirrups, and a top supporting standard adapted to be mounted in the tubular stringer and seated in the socket for the purpose defined.

2. Means for detachably mounting portions of a vehicle body and a top therefor, comprising a plurality of detachable stirrups constituting retaining members carried by portions of the body and arranged to vertically align in spaced relationship in assembly, a plurality of clamping plates arranged on the body in spaced relationship and aligning vertically with each other and with the stirrups in assembly, a tubular socket member carried by the clamping plates and arranged with an open end aligning with the stirrups, a tubular stringer member adapted to be trained through the respective stirrups and to be seated in the socket member whereby to maintain said portions of the body in assembly, and said stringer members being freely movable with respect to the stirrups, and a top supporting standard adapted to be mounted in the tubular stringer and seated in the socket for the purpose defined.

Signed at Seattle, Washington, this 8th day of May 1923.

HANS P. NELSON.
GEORGE DAVIES.